(12) United States Patent
Mukaigawa et al.

(10) Patent No.: US 12,403,853 B2
(45) Date of Patent: Sep. 2, 2025

(54) VEHICLE

(71) Applicant: TOYOTA JIDOSHA KABUSHIKI KAISHA, Toyota (JP)

(72) Inventors: Yuuki Mukaigawa, Seto (JP); Naoki Tani, Nagoya (JP); Ryuma Osaka, Toyota (JP); Shungo Iizuka, Toyota (JP); Shunji Shibata, Anjo (JP); Kyohei Miyaoka, Ikeda (JP); Masanori Kodera, Toyota (JP); Takashi Iwasaki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 18/126,708

(22) Filed: Mar. 27, 2023

(65) Prior Publication Data

US 2023/0311795 A1 Oct. 5, 2023

(30) Foreign Application Priority Data

Mar. 29, 2022 (JP) ................................. 2022-053204

(51) Int. Cl.
*B60R 16/04* (2006.01)
*B60K 1/04* (2019.01)
*B62D 21/15* (2006.01)
*B62D 25/20* (2006.01)

(52) U.S. Cl.
CPC ............... *B60R 16/04* (2013.01); *B60K 1/04* (2013.01); *B62D 21/155* (2013.01); *B62D 25/20* (2013.01); *B60K 2001/0438* (2013.01)

(58) Field of Classification Search
CPC ............. B60K 1/04; B60K 2001/0438; B62D 21/155; B62D 21/157
See application file for complete search history.

(56) References Cited

U.S. PATENT DOCUMENTS

| | | | |
|---|---|---|---|
| 9,809,101 B2* | 11/2017 | Ikeda | B62D 29/001 |
| 10,710,638 B2* | 7/2020 | Kawase | B60K 1/04 |
| 2014/0117716 A1* | 5/2014 | Patberg | B62D 21/15 |
| | | | 296/187.08 |
| 2015/0176673 A1 | 6/2015 | Kaneko et al. | |
| 2016/0083017 A1 | 3/2016 | Sakaguchi et al. | |
| 2016/0114667 A1* | 4/2016 | Ikeda | H01M 50/24 |
| | | | 180/68.5 |

(Continued)

FOREIGN PATENT DOCUMENTS

| | | |
|---|---|---|
| JP | 2008-174181 A | 7/2008 |
| JP | 2013-256265 A | 12/2013 |

(Continued)

*Primary Examiner* — Brian L Swenson
(74) *Attorney, Agent, or Firm* — Dinsmore & Shohl LLP

(57) ABSTRACT

A vehicle may include a vehicle body including a floor panel, a battery pack located below the floor panel and an energy absorption member located outwardly from the battery pack in a vehicle width direction and fixing the battery pack to the vehicle body. A support that protrudes downwardly may be disposed on a lower wall of the battery pack. The energy absorption member may include a protrusion that protrudes inwardly in the vehicle width direction toward the support. A tip end of the protrusion may include a contact surface being in contact with a side surface of the support in the vehicle width direction.

10 Claims, 7 Drawing Sheets

(56) References Cited

U.S. PATENT DOCUMENTS

| | | | |
|---|---|---|---|
| 2018/0072352 A1* | 3/2018 | Shimoda | B60K 6/28 |
| 2021/0221435 A1 | 7/2021 | Takahashi et al. | |
| 2022/0185379 A1* | 6/2022 | Kim | B60K 1/04 |
| 2022/0227215 A1* | 7/2022 | Ishizaki | B62D 21/157 |
| 2023/0202302 A1* | 6/2023 | Jo | B62D 21/11 |
| | | | 180/68.5 |
| 2024/0025486 A1* | 1/2024 | Watanabe | B60R 3/02 |

FOREIGN PATENT DOCUMENTS

| | | |
|---|---|---|
| JP | 2014-031109 A | 2/2014 |
| JP | 2014-080116 A | 5/2014 |
| JP | 2014-227075 A | 12/2014 |
| JP | 2017-226353 A | 12/2017 |
| JP | 2021-112973 A | 8/2021 |

\* cited by examiner

FIG. 5
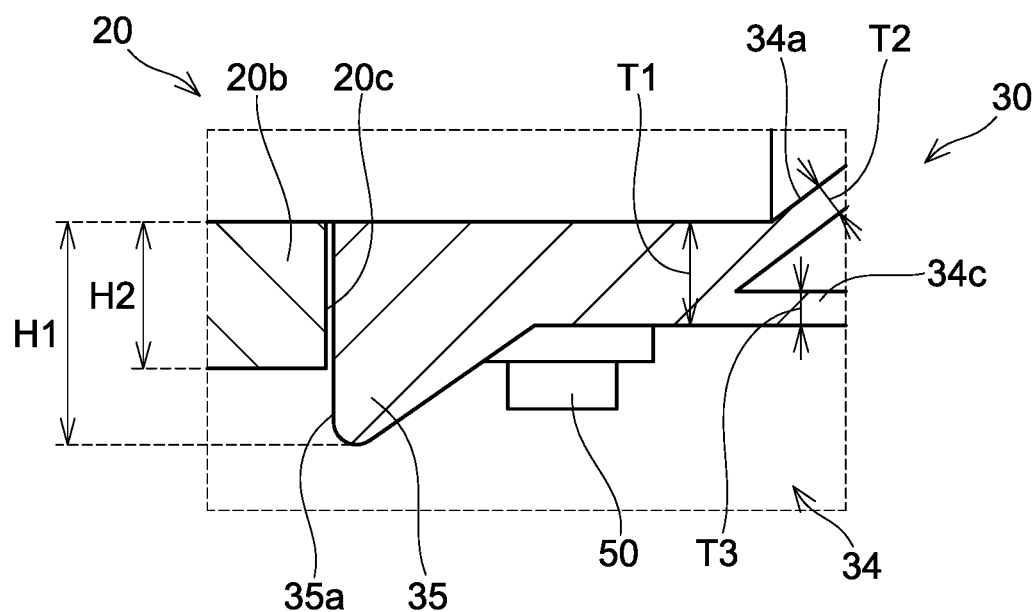
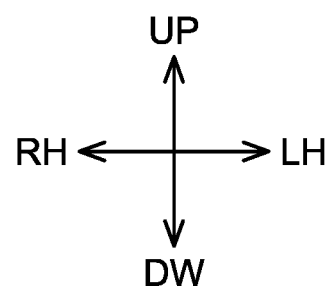

VEHICLE

CROSS-REFERENCE TO RELATED APPLICATION(S)

This application claims priority to Japanese patent application No. 2022-053204, filed on Mar. 29, 2022, the entire contents of which are incorporated herein by reference.

TECHNICAL FIELD

The technique disclosed herein relates to a vehicle.

BACKGROUND

Japanese Patent Application Publication No. 2017-226353 describes a vehicle. This vehicle includes a pair of rockers, a floor panel extending between the pair of rockers, a battery pack located below the floor panel, and an energy absorption member located outwardly from the battery pack in a vehicle width direction and fixed to one of the pair of rockers.

SUMMARY

With the above structure, when side collision occurs to the vehicle, an energy absorption member (which hereafter may be referred to as an EA member) deforms, by which collision energy is absorbed. At this time, if an inner sidewall of the EA member facing the battery pack is pressed against a sidewall of the battery pack, relatively large collision load may be applied on the sidewall of the battery pack.

In light of the above situation, the present disclosure provides a technique which may reduce collision load transmitted from an EA member to a sidewall of a battery pack.

The technique disclosed herein is implemented as a vehicle. This vehicle may comprise: a vehicle body comprising a floor panel; a battery pack located below the floor panel; and an energy absorption member located outwardly from the battery pack in a vehicle width direction and fixing the battery pack to the vehicle body. A support that protrudes downwardly may be disposed on a lower wall of the battery pack. The energy absorption member may comprise a protrusion that protrudes inwardly in the vehicle width direction toward the support. A tip end of the protrusion may comprise a contact surface being in contact with a side surface of the support in the vehicle width direction.

With the above structure, when side collision occurs to the vehicle, the EA member deforms, by which collision energy is absorbed. The EA member comprises the protrusion that protrudes inwardly in the vehicle width direction toward the support disposed on the lower wall of the battery pack, and the tip end of the protrusion comprises the contact surface being in contact with the side surface of the support. Thus, when side collision occurs to the vehicle, collision load applied on the EA member is transmitted to the support disposed on the lower wall of the battery pack via the protrusion. Consequently, collision load transmitted to the sidewall of the battery pack from the EA member can be reduced.

BRIEF DESCRIPTION OF DRAWINGS

FIG. 5 is an enlarged view of an enclosed area V in FIG. 3.

DETAILED DESCRIPTION

Figure 1:
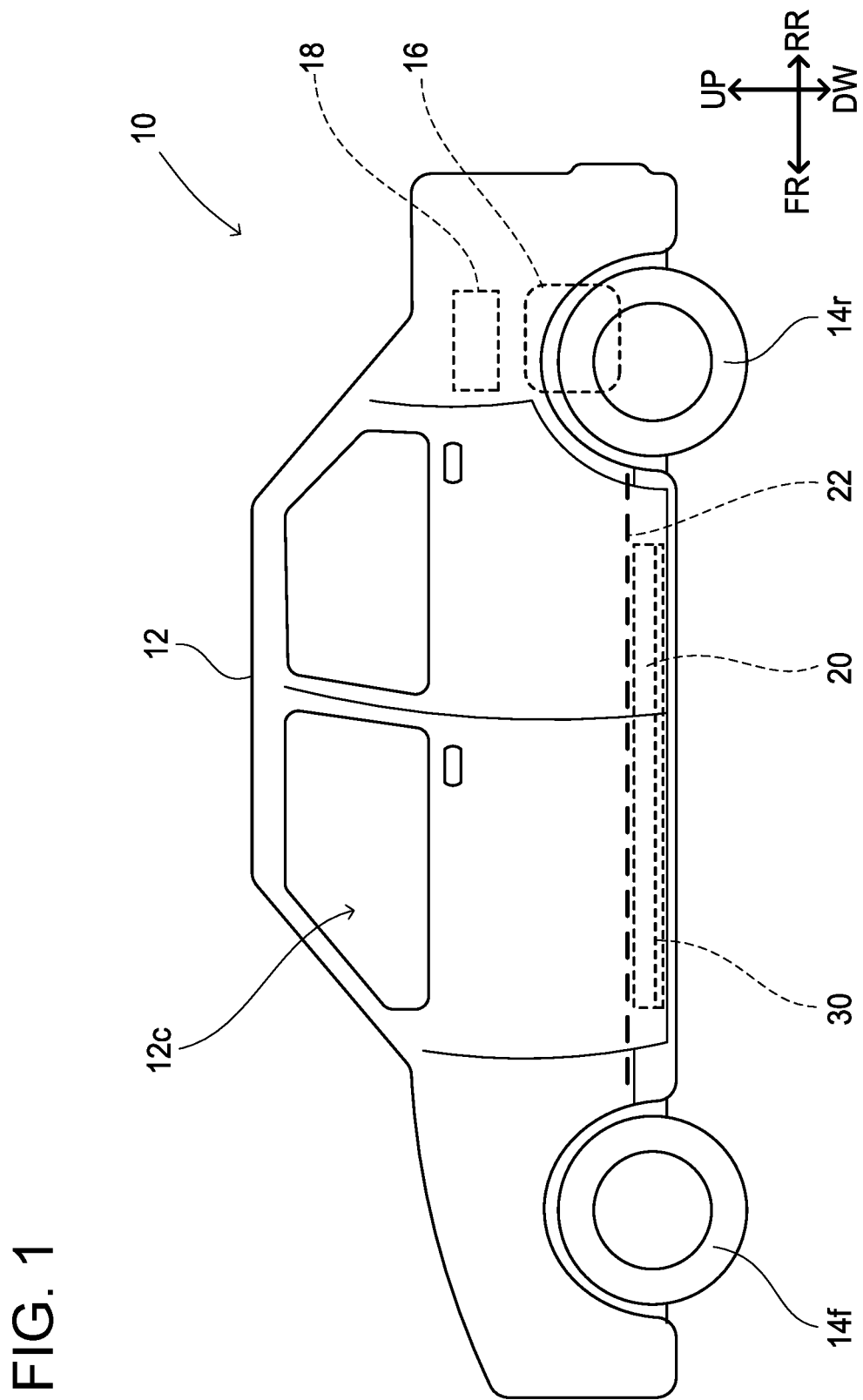
FIG. 1 schematically illustrates a configuration of a vehicle 10 of Embodiment 1.

In an embodiment of the technique disclosed herein, a dimension of the contact surface of the protrusion in a vehicle height direction may be equal to or greater than a dimension of the side surface of the support in the vehicle height direction. According to such a configuration, when side collision occurs to the vehicle, it is possible to avoid or suppress the protrusion of the EA member being locally pressed against the side surface of the support disposed on the battery pack. Consequently, it is possible to avoid or suppress collision load transmitted to the support being locally concentrated.

Alternatively to the aforementioned embodiment, a dimension of the contact surface of the protrusion in a vehicle height direction may be greater than a dimension of the side surface of the support in the vehicle height direction. As another embodiment, however, the dimension of the contact surface of the protrusion in the vehicle height direction may be equal to or smaller than the dimension of the side surface of the support in the vehicle height direction.

In an embodiment of the technique disclosed herein, at least a part of the protrusion may be located below the battery pack and extend along the lower wall of the battery pack. According to such a configuration, the dimension of a portion of the EA member in the vehicle width direction which is advantageous to absorb collision energy can be increased by the dimension of the protrusion in the vehicle width direction located below the battery pack. Consequently, when side collision occurs to the vehicle, the EA member deforms, by which collision energy to be absorbed can be increased.

In the aforementioned embodiment, the protrusion may be fixed to the lower wall of the battery pack with a bolt. According to such a configuration, the protrusion can firmly be fixed to the battery pack. Thus, when the EA member is compressed and deformed in the vehicle width direction toward to the sidewall of the protrusion, it is possible to avoid or suppress the protrusion being unintentionally separated away from the battery pack. As another embodiment, however, the protrusion may be fixed to the lower wall of the battery pack with, for example, an adhesive instead of the bolt.

In an embodiment of the technique disclosed herein, the protrusion may have a plate-like shape extending in the vehicle width direction. In this case, a thickness of the protrusion may be greater than a thickness of any one of walls that constitutes a rest of the energy absorption member. According to such a configuration, it is possible to make rigidity of the protrusion having the plate-like shape greater than rigidity of any one of the walls that constitute the rest of the EA member except the protrusion. Consequently, it is possible to make the protrusion less susceptible to deformation as compared to any one of the walls that constitute the rest of the EA member when the EA member is compressed and deformed in the vehicle width direction toward the battery pack. Thus, the collision energy generated in side collision occurring to the vehicle is primarily absorbed by deformation of a part of or an entirety of the rest of the EA member except the protrusion.

In an embodiment of the technique disclosed herein, in at least a part of the protrusion adjacent to the contact surface, a thickness of the protrusion may increase toward the contact surface. According to such a configuration, it is possible to make a minimum ground clearance of the protrusion (i.e., a distance from the ground surface to the lowest surface of the protrusion in the vehicle height direction) relatively great while rigidity of the contact surface of the protrusion is maintained.

In an embodiment of the technique disclosed herein, the support may be formed on a member that is attached to the battery pack. As another embodiment, however, the support may be formed integrally with the battery pack.

In an embodiment of the technique disclosed herein, the contact surface of the protrusion and the side surface of the support may have uneven shapes that engage each other. According to such a configuration, it is possible to increase an area where the contact surface of the protrusion is in contact with the side surface of the support. In particular, when the uneven shapes are defined along the vehicle height direction, it is possible to suppress the contact surface of the protrusion moving away from the side surface of the support when side collision occurs to the vehicle. Consequently, when side collision occurs to the vehicle, collision load applied on the EA member is effectively transmitted to the support disposed on the lower wall of the battery pack via the protrusion.

The simple recitations such as "forward", "rearward", "a longitudinal direction" herein respectively refer to forward, rearward and a longitudinal direction with respect to a vehicle. Similarly, the simple recitations such as "leftward", "rightward" and "a vehicle width direction" respectively refer to leftward, rightward and a vehicle width direction with respect to the vehicle and the simple recitations such as "upward", "downward" and "a height direction" refer to upward, downward and a height direction with respect to the vehicle. The vehicle width direction of the vehicle is also a left-right direction of the vehicle, and it may be referred to as "left-right direction" herein. For example, when the vehicle is placed on a horizontal surface, the height direction of the vehicle coincides with the vertical direction. The vehicle width direction of the vehicle is a direction parallel to the horizontal surface and parallel to an axle of the vehicle, and the longitudinal direction of the vehicle is a direction parallel to the horizontal surface and perpendicular to the axle of the vehicle.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENT

With reference to drawings, a vehicle 10 of an embodiment will be described. The vehicle 10 of the present embodiment is classified as an electric vehicle including a motor 16 driving wheels 14*f*, 14*r*, and is typically an electric vehicle which travels on roads (a so-called automobile). However, a part of or all the technique described in the present embodiment can similarly be applied to an electric vehicle which travels on tracks. The vehicle 10 is not limited to a vehicle operated and driven by a user, but may be a vehicle remotely operated by external device(s) or a vehicle which travels autonomously.

Here, a direction FR in the drawings indicates a front side in a longitudinal direction (or a front-rear direction) of the vehicle 10, and a direction RR indicates a rear side in the longitudinal direction of the vehicle 10. A direction LH indicates a left side in a vehicle width direction (or a left-right direction) of the vehicle 10 and a direction RH indicates a right side in the vehicle width direction of the vehicle 10. A direction UP indicates an upside in a height direction (or an up-down direction) of the vehicle 10, and a direction DW indicates a downside in the height direction of the vehicle 10.

As illustrated in FIG. 1, the vehicle 10 includes a vehicle body 12 and the plurality of wheels 14*f*, 14*r*. The vehicle body 12 includes a cabin 12*c* which is a space to accommodate occupants. The plurality of wheels 14*f*, 14*r* is rotatably attached to the vehicle body 12. The plurality of wheels 14*f*, 14*r* includes a pair of front wheels 14*f* positioned at a front portion of the vehicle body 12 and a pair of rear wheels 14*r* positioned at a rear portion of the vehicle body 12. The pair of front wheels 14*f* is disposed coaxially to each other, and the pair of rear wheels 14*r* is also disposed coaxially to each other. The number of wheels 14f, 14r is not limited to four. The vehicle body 12 is constituted of, but not particularly limited to, metal, such as steel or aluminum alloy.

Figure 2:
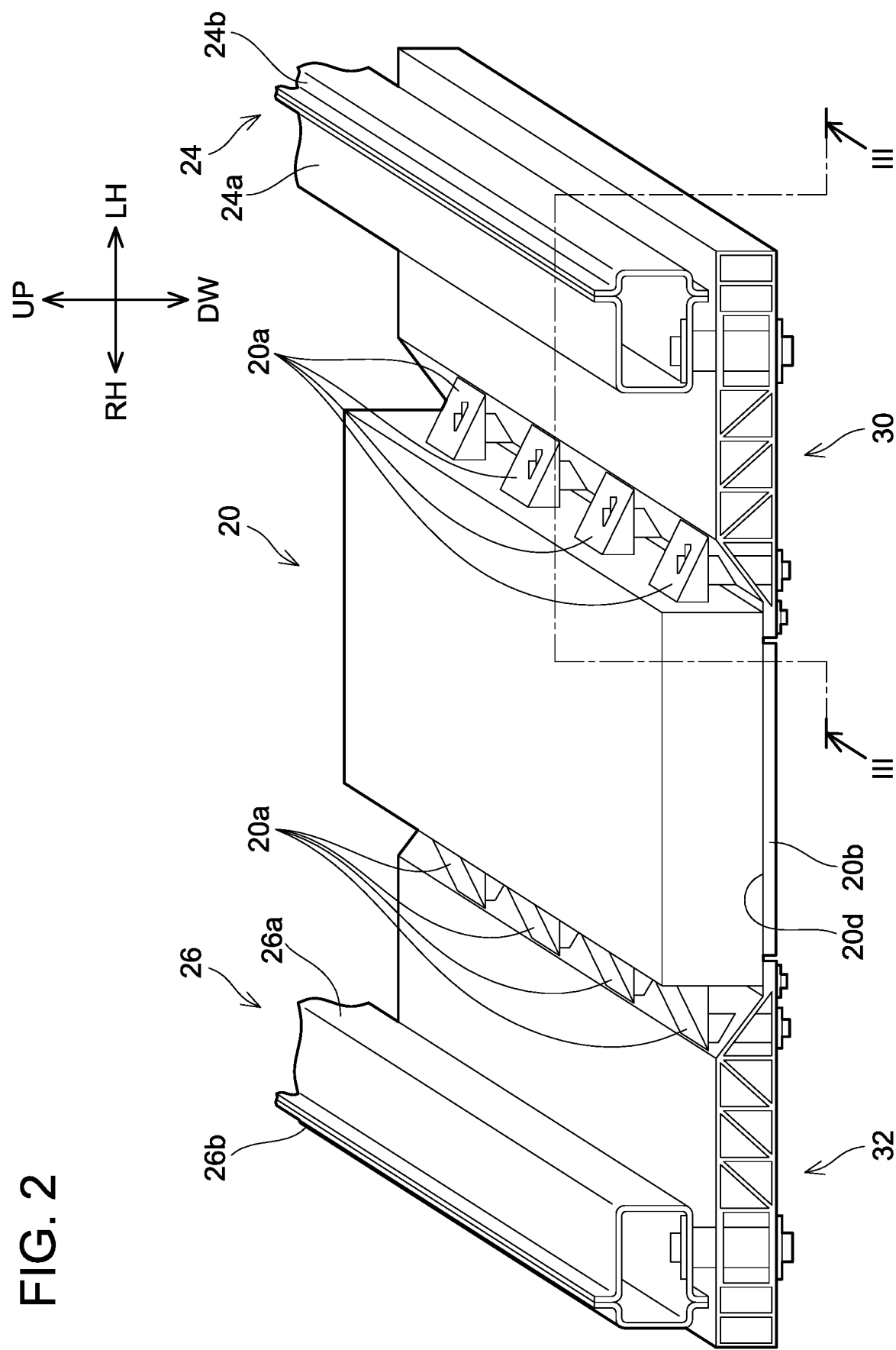
FIG. 2 is a view explaining positional relationships between a battery pack 20, a pair of EA members 30, 32 and a pair of rockers 24, 26.
Figure 3:
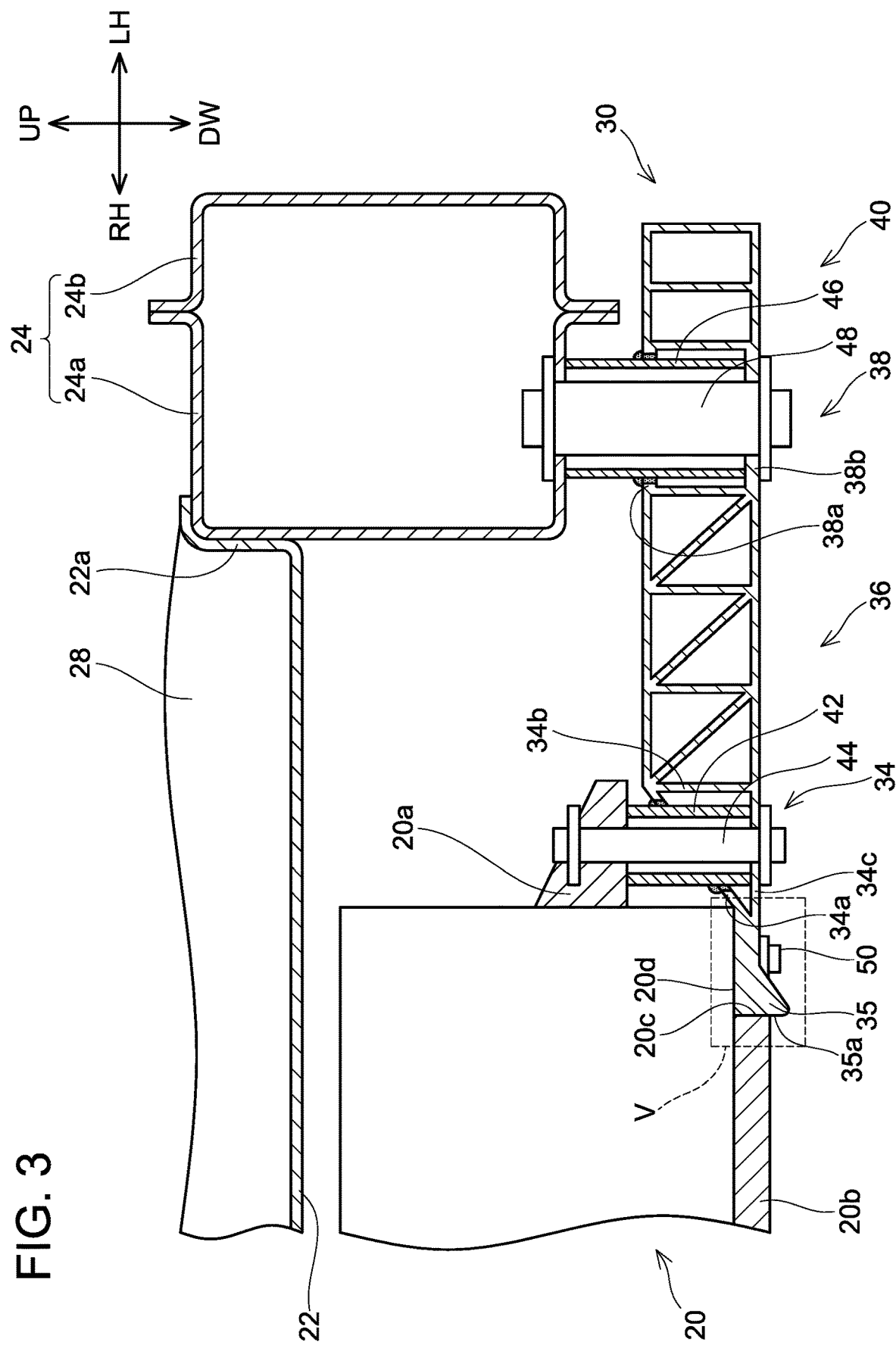
FIG. 3 is a cross-sectional view along a line of FIG. 2.

As illustrated in FIG. 1, the vehicle 10 further includes a motor 16, an electric control unit 18 and a battery pack 20. The motor 16 is a traction motor that drives the pair of rear wheels 14r and is connected to the pair of rear wheels 14r. The battery pack 20 is an electric device configured to supply power to the motor 16 and is electrically connected to the motor 16 via the electric control unit 18. The battery pack 20 houses a plurality of secondary battery cells and is rechargeable with external power or regenerative power of the motor 16. The battery pack 20 is located below a floor panel 22 and is disposed along the floor panel 22. Although this is merely an example, as illustrated in FIGS. 2 and 3, the battery pack 20 of the present embodiment includes brackets 20a protruding outwardly in the vehicle width direction. A support 20b that protrudes downwardly is disposed on a lower wall 20d of the battery pack 20. The support 20b is for example a lower cover to protect the lower wall 20d of the battery pack 20, and is attached to the lower wall 20d of the battery pack 20 as a member separate from the battery pack 20. The electric control unit 18 houses a DC-DC converter and/or inverter and is configured to control driving power supplied from the battery pack 20 to the motor 16 and regenerative power supplied from the motor 16 to the battery pack 20 depending on, for example, driving operations by the user. It should be noted that it is not necessary for the support 20b to be formed on a member that is attached to the battery pack 20, and the support 20b may integrally be formed with the battery pack 20.

Wheel(s) to be driven by the motor 16 are not limited to the pair of rear wheels 14r, and the motor 16 simply needs to be configured to drive at least one of the plurality of wheels 14f, 14r. The vehicle 10 may further include another prime mover such as an engine instead of or as an alternative to the motor 16. The vehicle 10 may include another power device such as fuel cell unit(s) or solar panel(s) instead of or as an alternative to the battery pack 20. The vehicle 10 is not limited to an electric automobile described herein but may be a hybrid vehicle, fuel-cell vehicle, a solar car, or the like.

As illustrated in FIGS. 2 and 3, the vehicle body 12 includes the floor panel 22, a pair of rockers 24, 26 and a floor crossbeam 28. The floor panel 22 is a plate-like member constituting a bottom surface of the cabin 12c. Each of the rockers 24, 26 is a hollow member having a constant cross-section along the vehicle longitudinal direction, and constitutes a frame of the vehicle body 12. The pair of rockers 24, 26 includes a left rocker 24 and a right rocker 26. The left rocker 24 is positioned at a left edge 22a of the floor panel 22 and extends in the front-rear direction on the outer side of the floor panel 22 in the vehicle width direction. The pair of rockers 24 is arranged symmetrically to each other with respect to the vehicle width direction. Thus, the right rocker 26 is positioned at a right edge of the floor panel 22 and extends in the front-rear direction on the outer side of the floor panel 22 in the vehicle width direction.

Although not particularly limited to this configuration, the left rocker 24 includes a left rocker inner panel 24a positioned on the inner side in the width direction and a left rocker outer panel 24b positioned on the outer side in the width direction. The left rocker inner panel 24a and the left rocker outer panel 24b are joined to each other at the respective top and bottom edges, and a closed space extending in the front-rear direction is defined inside the left rocker 24. Although not particularly limited to this configuration as well, the right rocker 26 includes a right rocker inner panel 26a positioned on the inner side in the width direction and a right rocker outer panel 26b positioned on the outer side in the width direction. The right rocker inner panel 26a and the right rocker outer panel 26b are joined to each other at the respective top and bottom edges, and a closed space extending in the front-rear direction is defined inside the right rocker 26. The floor panel 22 extends between the pair of rockers 24, 26 and is joined to the left rocker inner panel 24a at its left edge 22a and joined to the right rocker inner panel 26a at its right edge. The rockers 24, 26 may be constituted of three or more panels, not limited only to the rocker inner panels 24a, 26a and the rocker outer panels 24b, 26b.

The floor crossbeam 28 is a hollow member having a constant cross section along the vehicle longitudinal direction and constitutes a part of the flame of the vehicle body 12. The floor crossbeam 28 is positioned on the floor panel 22 and extends between the pair of rockers 24, 26 in the vehicle width direction. Although the illustration is omitted, a plurality of floor crossbeams 28 is disposed between the pair of rockers 24, 26.

As illustrated in FIGS. 2, 3, the vehicle 10 further includes a pair of energy absorption members 30, 32 (hereafter referred to as EA members 30, 32). Each of the pair of EA members 30, 32 is a hollow member extending along the vehicle longitudinal direction and having a constant cross section along the vehicle longitudinal direction. The pair of EA members 30, 32 includes a left EA member 30 and a right EA member 32. The pair of EA members 30, 32 is arranged symmetrically to each other with respect to the vehicle width direction. The left EA member 30 is located at a left portion of the vehicle 10 and outwardly from the battery pack 20 in the vehicle width direction. The right EA member 32 is located at a right portion of the vehicle 10 and outwardly from the battery pack 20 in the vehicle width direction. One of the EA members 30, 32 is compressed and deformed when side collision occurs to the vehicle 10, by which it absorbs collision energy. The pair of EA members 30, 32 is constituted of metal such as aluminum. However, a material constituting the pair of EA members 30, 32 is not particularly limited.

As described above, the pair of EA members 30, 32 is arranged symmetrically to each other with respect to the vehicle width direction. Structures of the left EA member 30 and its relevant members (e.g., the battery pack 20 and the left rocker 24) are symmetrical to structures of the right EA member 32 and its relevant members (e.g., the battery pack 20 and the right rocker 26) with respect to the vehicle width direction. Thus, with reference to FIG. 3, the structures of the left EA member 30 and its relevant members (e.g., the battery pack 20 and the left rocker 24) will hereafter be described. Hereafter, the left EA member 30 will simply be referred to as the EA member 30.

As illustrated in FIG. 3, the EA member 30 includes an inner end portion 34, a first middle portion 36, a second middle portion 38 and an outer end portion 40. The inner end portion 34 is at the innermost position in the vehicle width direction and faces the battery pack 20. The outer end portion 40 is at the outermost position in the vehicle width direction. The first middle portion 36 and the second middle portion 38 are positioned between the inner end portion 34 and the outer end portion 40 in the vehicle width direction. The first middle portion 36 is adjacent to the inner end portion 34 and the second middle portion 38 is adjacent to the outer end portion 40. In other words, the inner end portion 34, the first middle portion 36, the second middle portion 38 and the outer end portion 40 are arranged in this order from inside to outside in the vehicle width direction.

Although not particularly limited to this configuration, the inner end portion 34 includes an inner sidewall 34a, a vertical wall 34b and a lower wall 34c. The inner sidewall 34a faces the battery pack 20 and inclines downwardly in the vehicle height direction as it extends inwardly in the vehicle width direction. The vertical wall 34b extends along the vehicle height direction and the lower wall 34c extends along the vehicle width direction. Thus, a space having a constant cross-section in the vehicle longitudinal direction is defined by the inner sidewall 34a, the vertical wall 34b and the lower wall 34c.

As illustrated in FIG. 3, the vehicle 10 further includes first collars 42 and first bolts 44. The inner sidewall 34a included in the inner end portion 34 of the EA member 30 comprises openings through which the first collars 42 extend. The first collars 42 are disposed such that the first collars 42 extend though the openings in the inner sidewall 34a in the vehicle height direction. Although this is an example, the first collars 42 are welded to the inner sidewall 34a of the EA member 30. The upper end of each first collar 42 is in contact with corresponding one of the brackets 20a of the battery pack 20 and the lower end of each first collar 42 is in contact with the lower wall 34c of the inner end portion 34. The first bolts 44 extend though the first collars 42 and fasten the EA member 30 to the brackets 20a of the battery pack 20. Thus, the EA member is fixed to the brackets 20a of the battery pack 20 at the inner end portion 34. An inner diameter D1 of the first collars 42 is greater than a nominal diameter D2 of the first bolts 44. For example, the inner diameter D1 of the first collars 42 is at least twice the nominal diameter D2 of the first bolts 44. As another embodiment, the brackets 20a may not be disposed on the battery pack 20, and the EA member 30 may directly be fastened to the battery pack 20 by the first bolts 44.

As illustrated in FIG. 3, the vehicle 10 further includes second collars 46 and second bolts 48. Although not particularly limited to this configuration, an upper wall 38a of the second middle portion 38 of the EA member 30 also includes openings through which the second collars 46 extend. The second collars 46 are disposed such that the second collars 46 extend though the openings in the upper wall 38a of the second middle portion 38 in the vehicle height direction. Although this is an example, the second collars 46 are welded to the upper wall 38a of the second middle portion 38. The upper ends of the second collars 46 are in contact with the left rocker inner panel 24a of the left rocker 24 and the lower ends of the second collars 46 are in contact with the lower wall 38b of the second middle portion 38. The second bolts 48 extend through the second collars 46 and fasten the EA member 30 to the left rocker 24. Thus, the EA member 30 is fixed to the left rocker 24 of the vehicle body 12 at the second middle portion 38. As described above, the EA member 30 is fixed to the brackets 20a of the battery pack 20 at the inner end portion 34, thus the EA member 30 fixes the battery pack 20 to the vehicle body 12. Although not particularly limited to this configuration, the inner diameter of the second collars 46 is greater than the nominal diameter of the second bolts 48.

It should be noted that, the position where the EA member 30 is fixed to the bracket 20a of the battery pack 20 does not need to be the inner end portion 34. The position where the EA member 30 is fixed to the bracket 20a of the battery pack 20 can suitably be changed depending on, for example, a shape of the EA member 30 and/or a positional relationship between the EA member 30 and the battery pack 20. Similarly, the position where the EA member 30 is fixed to the left rocker 24 of the vehicle body 12 does not need to be the second middle portion 38. The position where the EA member 30 is fixed to the left rocker 24 of the vehicle body 12 can suitably be changed depending on, for example, the shape of the EA member 30 and a positional relationship between the EA member 30 and the left rocker 24.

As illustrated in FIG. 3, the EA member 30 further includes a protrusion 35. The protrusion 35 is connected to the lower wall 34c and the inner sidewall 34a of the inner end portion 34 and extends inwardly in the vehicle width direction toward the support 20b disposed on the battery pack 20. The protrusion 35 is located below the battery pack 20 and extends along the lower wall 20d of the battery pack 20. The protrusion 35 is fixed to the lower wall 20d of the battery pack 20 with a third bolt 50. The tip end of the protrusion 35 comprises a contact surface 35a being in contact with a side surface 20c of the support 20b in the vehicle width direction. An entirety of the protrusion 35 needs not to be located below the battery pack 20, and only at least one of the protrusion 35 has to be located below the battery pack 20. As another embodiment, the protrusion 35 may be fixed to the lower wall 20d of the battery pack 20 with for example an adhesive, instead of the third bolt 50.

Figure 4:
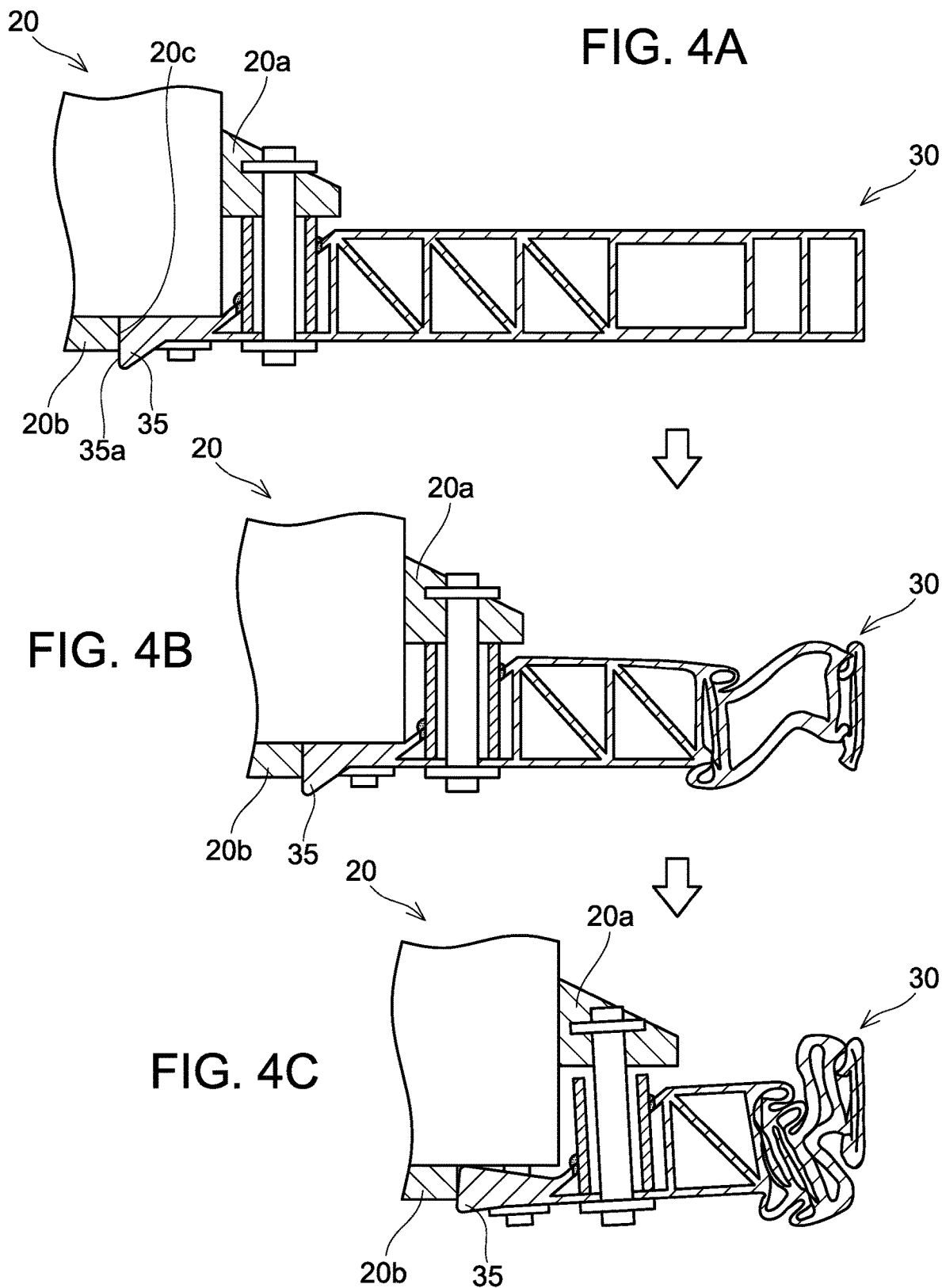
FIG. 4A illustrates an example of deformation of the EA member 30 at time when side collision occurs to the vehicle 10.
FIG. 4B illustrates an example of deformation of the EA member at a subsequent time when side collision occurs to the vehicle.
FIG. 4C illustrates an example of deformation of the EA member at another subsequent time when side collision occurs to the vehicle.
Figure 6:
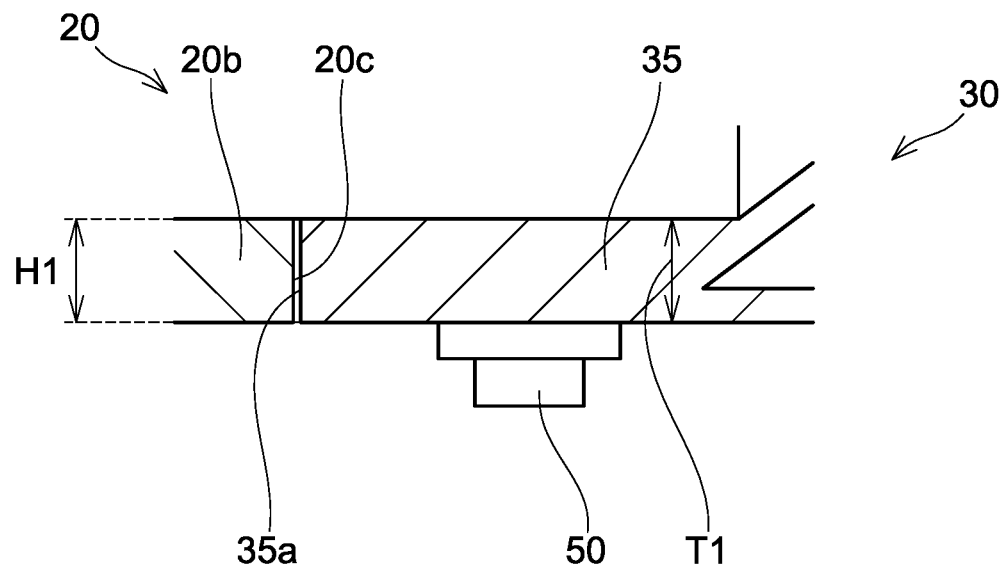
FIG. 6 is a view to explain a variant of shapes of a contact surface 35a of a protrusion 35 and a side surface 20c of a support 20b.

With the aforementioned structure, as illustrated in FIGS. 4A to 4C, one of the EA members 30, 32 deforms when side collision occurs to the vehicle 10, by which collision energy is absorbed. Each of the EA members 30, 32 includes the protrusion 35 which protrudes inwardly in the vehicle width direction toward the support 20b disposed on the lower wall 20d of the battery pack 20, and the tip end of the protrusion 35 comprises the contact surface 35a being in contact with the side surface 20c of the support 20b. Thus, when side collision occurs to the vehicle 10, collision load applied on one of the EA members 30, 32 is transmitted to the support 20b disposed on the lower wall 20d of the battery pack 20. Consequently, the collision load transmitted from the one of the EA members 30, 32 to the corresponding sidewall of the battery pack 20 can be reduced.

Although not particularly limited to this configuration, as illustrated in FIG. 5, the dimension H1 of the contact surface 35a of the protrusion 35 in the vehicle height direction is equal to or greater than the dimension H2 of the side surface 20c of the support 20b in the vehicle height direction, and more specifically, greater than the dimension H2 of the side surface 20c of the support 20b in the vehicle height direction. According to such a configuration, when side collision occurs to the vehicle 10, it is possible to avoid or suppress the protrusion 35 of one of the EA members 30, 32 being locally pressed against the corresponding side surface 20c of the support 20b disposed on the battery pack 20. Consequently, it is possible to avoid or suppress collision load transmitted to the support 20b being locally concentrated. As another embodiment, however, the dimension H1 of the contact surface 35a of the protrusion 35 in the vehicle height direction may be smaller than the dimension H2 of the side surface 20c of the support 20b in the vehicle height direction.

Although not particularly limited to this configuration, as illustrated in FIG. 5, the protrusion 35 has a plate-like shape extending in the vehicle width direction. In this case, the thickness T1 of the protrusion 35 is greater than the thickness of any one of the walls that constitute the rest of the EA member 30 (i.e., each of the thicknesses T2, T3 of the walls 34a to 34c that constitute the inner end portion 34, a thickness of any one of walls constituting the first middle portion 36, a thickness of each of the walls 38a, 38b that constitute the second middle portion 38 and a thickness of any one of walls that constitute the outer end portion 40). According to such a configuration, in the EA members 30, 32, it is possible to make rigidity of the protrusions 35 having the plate-like shape greater than rigidity of any one of the walls that constitute the rest of the EA members 30, 32 except the protrusions 35. Consequently, when one of the EA members 30, 32 is compressed and deformed in the vehicle width direction toward the battery pack 20, it is possible to make the corresponding protrusion 35 less susceptible to deformation as compared to any one of the walls that constitute the rest of the one of the EA members 30, 32, which is the inner end portion 34, the first middle portion 36, the second middle portion 38, and the outer end portion 40. Thus, the collision energy generated in side collision occurring to the vehicle 10 is primarily absorbed by deformation of a part of or the entirety of the rest of the one of the EA members 30, 32 except the protrusion 35.

Although not particularly limited to this configuration, as illustrated in FIG. 5, in at least a part of the protrusion 35 adjacent to the contact surface 35*a*, the thickness of the protrusion 35 increases toward the contact surface 35*a*. In other words, the thickness T1 of the protrusion 35 changes such that it increases toward the contact surface 35*a*. For example, a thickness of a part of the protrusion 35 at which the third bolt 50 is disposed can relatively be reduced and a thickness of the contact surface 35*a* at the tip end of the protrusion 35 (i.e., the dimension H1 of the contact surface 35*a* in the vehicle height direction) can relatively be increased. According to such a configuration, it is possible to make the minimum ground clearance of the protrusion 35 (i.e., a distance from the ground surface to the lowest surface of the protrusion 35 in the vehicle height direction) relatively great while rigidity of the contact surface 35*a* of the protrusion 35 is maintained.

Figure 7:
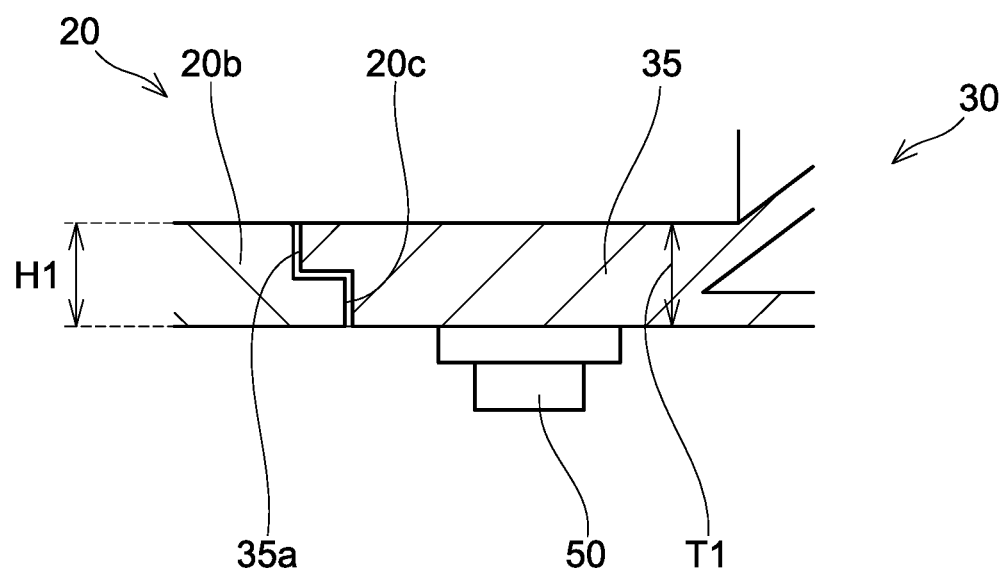
FIG. 7 is a view to explain a variant of shapes of the contact surface 35a of the protrusion 35 and the side surface 20c of the support 20b.
Figure 8:
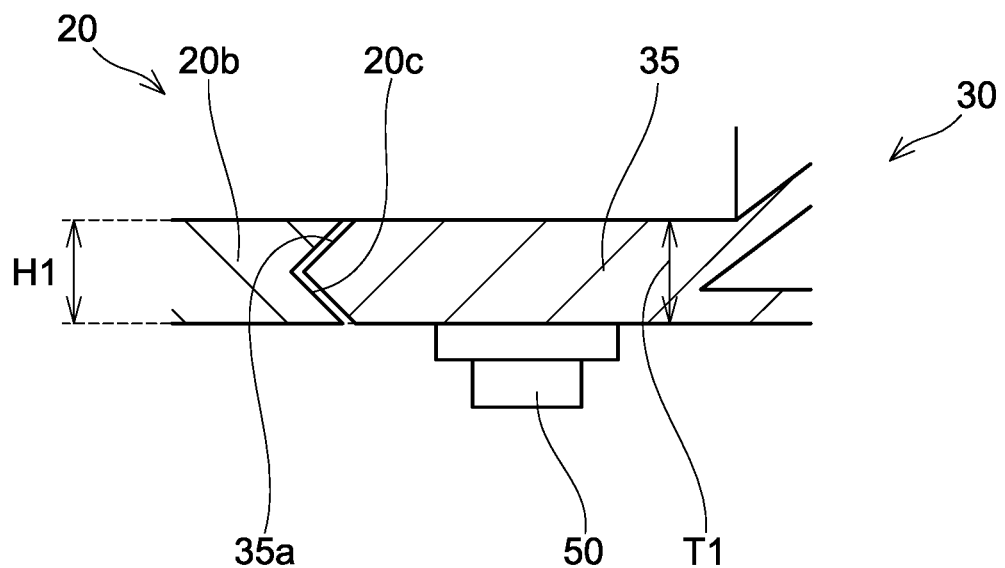
FIG. 8 is a view to explain a variant of shapes of the contact surface 35a of the protrusion 35 and the side surface 20c of the support 20b.
Figure 9:
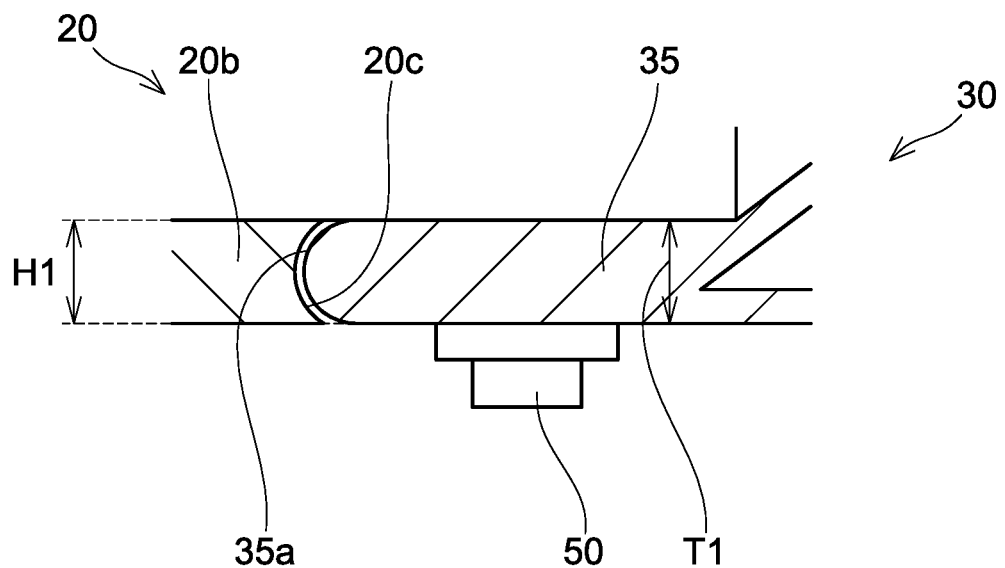
FIG. 9 is a view to explain a variant of shapes of the contact surface 35a of the protrusion 35 and the side surface 20c of the support 20b.

Alternatively to the aforementioned embodiment, as illustrated in FIGS. 6 to 9, the thickness T1 of the protrusion 35 may be constant. In this case, the thickness T1 of the protrusion 35 may be equal to the dimension H1 of the contact surface 35*a* of the protrusion 35 in the vehicle height direction. The contact surface 35*a* disposed at the tip end of the protrusion 35 and the side surface 20*c* of the support 20*b* can have various shapes. For example, as illustrated in FIGS. 7-9, the contact surface 35*a* disposed at the tip end of the protrusion 35 has a shape protruding inwardly in the vehicle width direction toward the side surface 20*c* of the support 20*b*. The side surface 20*c* of the support 20*b* is recessed inwardly in the vehicle width direction to receive the contact surface 35*a* of the protrusion 35. As described above, when the contact surface 35*a* of the protrusion 35 and the side surface 20*c* of the support 20*b* have uneven shapes which engage each other, it is possible to increase an area where the contact surface 35*a* of the protrusion 35 is in contact with the side surface 20*c* of the support 20*b*. In particular, when the uneven shapes are defined along the vehicle height direction, it is possible to suppress the contact surface 35*a* of the protrusion 35 moving away from the side surface 20*c* of the support 20*b* upon side collision to the vehicle 10. Consequently, when side collision occurs to the vehicle 10, collision load applied on one of the EA members 30, 32 is effectively transmitted to the support 20*b* disposed on the lower wall 20*d* of the battery pack 20 via the corresponding protrusion 35.

What is claimed is:
1. A vehicle comprising:
a vehicle body comprising a floor panel;
a battery pack located below the floor panel; and
an energy absorption member located outwardly from the battery pack in a vehicle width direction and fixing the battery pack to the vehicle body,
wherein:
a support that protrudes downwardly is disposed on a lower wall of the battery pack,
the energy absorption member comprises a protrusion that protrudes inwardly in the vehicle width direction toward the support,
a tip end of the protrusion comprises a contact surface being in contact with a side surface of the support in the vehicle width direction, and
a dimension of the contact surface of the protrusion in a vehicle height direction is equal to or greater than a dimension of the side surface of the support in the vehicle height direction.

2. The vehicle according to claim 1, wherein at least a part of the protrusion is located below the battery pack and extends along the lower wall of the battery pack.

3. The vehicle according to claim 2, wherein the protrusion is fixed to the lower wall of the battery pack with a bolt.

4. The vehicle according to claim 1, wherein, in at least a part of the protrusion adjacent to the contact surface, a thickness of the protrusion increases toward the contact surface.

5. The vehicle according to claim 1, wherein the support is formed on a member that is attached to the battery pack.

6. The vehicle according to claim 1, wherein the support is formed integrally with the battery pack.

7. The vehicle according to claim 1, wherein the contact surface of the protrusion and the side surface of the support have uneven shapes that engage each other.

8. A vehicle comprising:
a vehicle body comprising a floor panel;
a battery pack located below the floor panel; and
an energy absorption member located outwardly from the battery pack in a vehicle width direction and fixing the battery pack to the vehicle body,
wherein:
a support that protrudes downwardly is disposed on a lower wall of the battery pack,
the energy absorption member comprises a protrusion that protrudes inwardly in the vehicle width direction toward the support,
a tip end of the protrusion comprises a contact surface being in contact with a side surface of the support in the vehicle width direction, and
a dimension of the contact surface of the protrusion in a vehicle height direction is greater than a dimension of the side surface of the support in the vehicle height direction.

9. A vehicle comprising:
a vehicle body comprising a floor panel;
a battery pack located below the floor panel; and
an energy absorption member located outwardly from the battery pack in a vehicle width direction and fixing the battery pack to the vehicle body,
wherein:
a support that protrudes downwardly is disposed on a lower wall of the battery pack, the energy absorption member comprises a protrusion that protrudes inwardly in the vehicle width direction toward the support, a tip end of the protrusion comprises a contact surface being in contact with a side surface of the support in the vehicle width direction, and at least a part of the protrusion is located below the battery pack and extends along the lower wall of the battery pack.

10. The vehicle according to claim 9, wherein the protrusion is fixed to the lower wall of the battery pack with a bolt.

* * * * *